April 6, 1954 C. H. STEVENSON 2,674,638
INDUCTION METAL MELTING FURNACE
Filed March 12, 1952
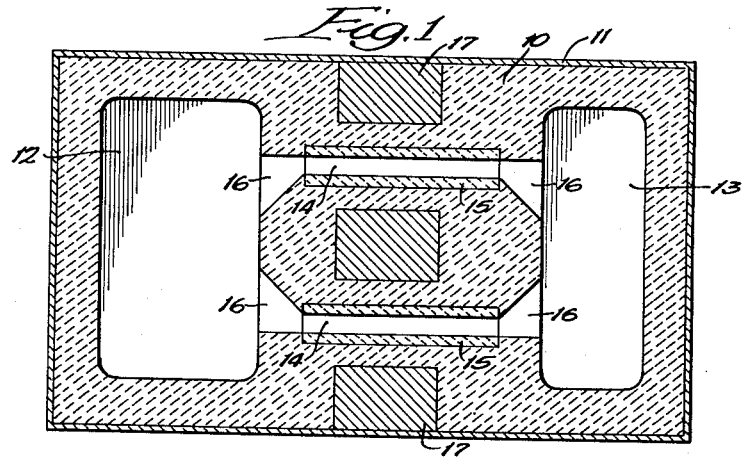
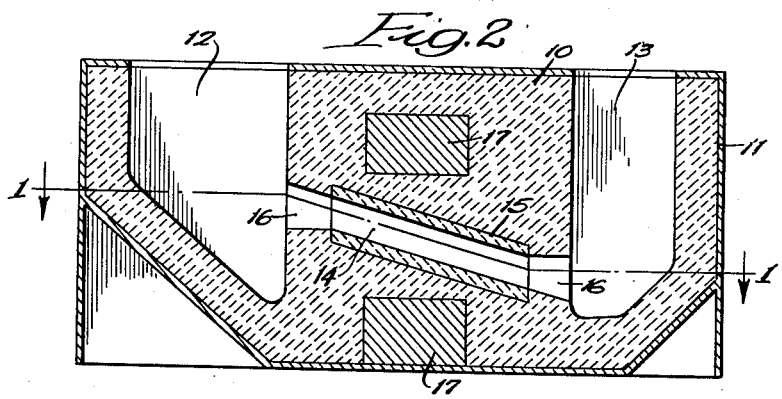
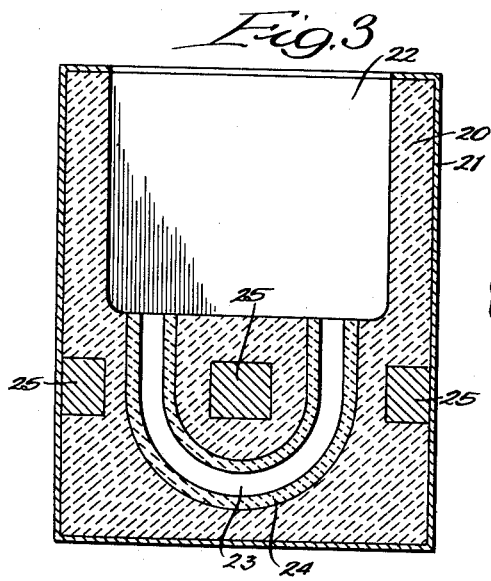
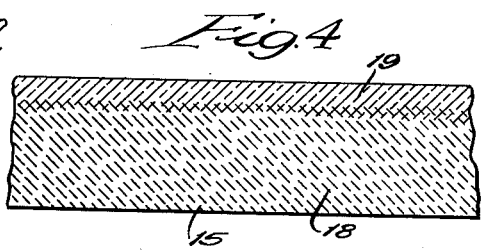
INVENTOR:
Cary H. Stevenson,
BY
E. A. Booth
ATTORNEY.

Patented Apr. 6, 1954

2,674,638

UNITED STATES PATENT OFFICE 2,674,638

INDUCTION METAL MELTING FURNACE

Cary H. Stevenson, Chicago, Ill., assignor to Lindberg Engineering Company, Chicago, Ill., a corporation of Illinois Application March 12, 1952, Serial No. 276,177

11 Claims. (Cl. 13—29)

This invention relates to induction metal melting furnaces and more particularly to submerged channel type furnaces.

In submerged channel furnaces the induction produces a so-called pinch effect in the channels tending to force molten metal in both directions from the central part of the channels. This in turn causes a partial vacuum in the channels which draws air through the walls of the channels which are of refractory material to withstand the molten metal and to be non-conducting. Even with separately cast channels which are highly compacted and which have polished surfaces the channel walls and the refractory furnace body in which they are enclosed are pervious to the passage of air.

When air enters the channels it reacts with the molten metal to form oxides. This interferes with maintenance of the desired composition in the case of alloys and in all cases forms slag or dross which tends to collect in the channels and interfere with proper operation of the furnace.

In my copending application Serial No. 276,367 filed March 13, 1952, I have proposed one solution to the problem by supplying an inert gas to the channels. The present invention provides another manner of preventing access of air to the channels in cases where inert gas is not available or where for some other reason its use is not desirable.

It is, therefore, one of the objects of the present invention to provide an induction metal melting furnace in which air is kept out of the channels during operation.

Another object is to provide a furnace in which the channels are made impervious to air by covering at least one surface thereof with an impervious vitrified covering.

According to one feature of the invention, the channels are precast of refractory material, are covered on their outer surfaces with a vitrified impervious covering, and are then enclosed or imbedded in the refractory body of the furnace.

The above and other objects and advantages of the invention will be more readily apparent when viewed in connection with the accompanying drawings, in which:

Figure 1 is a horizontal sectional view on the line 2—2 of Figure 1 of a furnace embodying the invention;

Figure 2 is a vertical section through the furnace;

Figure 3 is a vertical section through another type of furnace to which the invention is applied and Figure 4 is an enlarged partial section through a wall of one of the tubes.

The invention is illustrated in Figures 1 and 2 in connection with a two chamber furnace comprising a body 10 of ceramic material which is enclosed in and supported by an outer metal shell 11. The body 10 is formed with a pair of open topped chambers 12 and 13 spaced horizontally and connected by channels 14 beneath the normal level of molten metal in the chambers. Preferably the channels 14 are formed by separate tubes 15 of ceramic material which are enclosed in the ceramic body 10 and which are connected to the chambers through flared openings 16 formed in the body 10.

To melt the metal in the channels and chambers an electric induction unit is provided threading the channels intermediate their ends. The unit as shown comprises a magnetic core 17 having end legs extending along the outer sides of the channels, a center leg extending between the channels and top and bottom legs connecting the end and center legs. An energizing winding not shown is provided on the core so that when the core is energized it will induce flow of current through the metal in the channels and chambers to heat and melt the metal. It will be noted that the induction coil is positioned entirely between the ends of the channels and between the ends of the tubes 15 so that its magnetic center lies intermediate the tube ends.

In the normal operation of a furnace of this type a so-called pinch effect occurs in the central parts of the tubes generally in the plane of the magnetic center of the inductive unit which causes the metal in the tubes to tend to flow outwardly in both directions from the center. This effect creates a partial vacuum in the central parts of the tubes which will tend to draw air into the tubes through the refractory body 10 which is pervious to air and through the walls of the tubes themselves which are also formed of a refractory or ceramic material and are therefore also normally pervious to air. This action will occur even though the body is substantially enclosed in a shell 11 which is airtight, since the air will permeate the ceramic body 10 through the upper portions of the walls of chambers 12 and 13.

According to the present invention, entrance of air into the channels during operation is prevented by so forming the tubes 15 that they will be airtight. For this purpose at least the outer surfaces of the tubes are coated or impregnated with a material which will form an airtight covering thereon so that air cannot be drawn through the tube walls. One convenient manner of accomplishing this is to dip or otherwise coat the outer surfaces of the tubes with a vitreous enamel which can be drawn into the pores of the tubes if desired by subjecting the tubes to vacuum. Thereafter, the tubes are baked to vitrify or fuse the enamel material, thereby to form a continuous impervious covering over the tube walls. The tubes can thereafter be mounted in the refractory body 10 in the usual manner.

Since in operation the pinch effect occurs only in the central parts of the tubes, air tends to be drawn into the channels only through the tube walls themselves. Therefore by making the tube walls impervious to air access of air to the molten metal is prevented so that the metal will be melted without oxidation and with a minimum formation of slag or dross.

For many types of metals such as aluminum or magnesium, which might react with the vitreous material the outer surface of the tubes is covered. With other metals such as certain types of ferrous metals and various brass compositions which do not react with the vitreous material the inner and outer surfaces of the tubes may both be covered in the same manner to provide a somewhat more effective seal. Alternatively the channels 14 may be formed directly in the refractory body 10 and may be covered with a vitrified material before placing the furnace in service.

Figure 4 illustrates in enlarged section the general character of the tubes 15 when one wall only is covered as described. As there shown the tube wall indicated at 18 is of refractory material which may be compact and cured to form a complete self supporting tube. The outer surface of the tube as indicated at 19 is covered and at least partially impregnated by a vitrified material which may be formed as described above by coating and partially impregnating the surface with a vitreous enamel which is thereafter heated to fuse the particles. The covering 19 forms a continuous fused surface which is impervious to air and which will prevent entrance of any air into the channels while the metal contacts only the inner engaged surfaces of the refractory tubes.

Figure 3 illustrates application of the invention to a single chamber vertical type furnace which comprises a refractory body 20 enclosed in and supported by a metal shell 21. At its upper end the body is formed with a chamber 22 to hold the molten metal. Below the chamber a looped channel 23 extends downwardly into the body 20 and has its ends communicating with the bottom of the chamber. The channel 23 may be formed by a looped ceramic tube 24 which is enclosed in the ceramic body 20.

Heat is supplied by an electric induction unit including a core 25 threaded around the channel 24 and lying completely between the ends of the channel. The core 25 carries an energizing winding not shown.

In operation of this type of furnace, the pinch effect referred to above will occur in those portions of the channel 23 which register with the magnetic center of the induction unit and will tend to draw air into the channel. To prevent this the tube 24 may be covered with a vitrified covering as described above, which is impervious to air.

In the event there should be any leakage through the channel walls due, for example, to cracks or other openings in the vitrified covering, entrance of air into the channels can still be prevented by supplying inert gas to the ceramic bodies 10 or 20 to envelope the channels. Thus, if there is any leakage the inert gas rather than air will be drawn into the channels and there will be no oxidation of the metal. Vitrifying the channels as described is advantageous even when the use of an inert gas is desirable since even a partial vitrification of the channel walls will substantially reduce the amount of gas drawn into the channels.

While several embodiments of the invention have been shown and described in detail it will be understood that these are illustrative only and are not to be taken as a definition of the scope of the invention, reference being had for this purpose to the appended claims.

What is claimed is:

1. In an induction metal melting furnace, an elongated tube formed of electrically non-conducting refractory material which is normally pervious to air and adapted to contain molten metal, an electric induction unit around the tube with its magnetic center intermediate the ends of the tube to induce heating current in the metal in the tube, and an air impervious covering on the tube to prevent flow of air through the tube into the metal therein.

2. In an induction metal melting furnace, an elongated tube formed of electrically non-conducting refractory material which is normally pervious to air and adapted to contain molten metal, an electric induction unit around the tube with its magnetic center intermediate the ends of the tube to induce heating current in the metal in the tube, and a vitrified covering on at least one surface of the tube to make the tube wall impervious to air.

3. An induction metal melting furnace comprising a body of electrically non-conducting refractory material formed with a chamber to hold molten metal, a tube formed of electrically non-conducting refractory material which is normally pervious to air communicating with the chamber and enclosed in the body of refractory material, an electric induction unit around the tube with its magnetic center intermediate the ends of the tube to induce heating current in the metal in the tube, and a covering on at least one surface of the tube which is impervious to air.

4. An induction metal melting furnace comprising a body of electrically non-conducting refractory material formed with a chamber to hold molten metal, a tube formed of electrically non-conducting refractory material which is normally pervious to air communicating with the chamber and enclosed in the body of refractory material which is normally pervious to air communicating with the chamber and enclosed in the body of refractory material, an electric induction unit around the tube with its magnetic center intermediate the ends of the tube to induce heating current in the metal in the tube, and a vitrified covering which is impervious to air on the outer surface of the tube.

5. An induction metal melting furnace comprising a body of electrically non-conducting refractory material formed with a pair of horizontally spaced chambers, tubes formed of electrically non-conducting refractory material which is normally pervious to air enclosed in the body of refractory material and connecting the chambers below the normal level of molten metal therein, an electric induction unit threading the tubes with its magnetic center intermediate the ends of the tubes to induce heating current in the metal in the tubes, and a covering of material which is impervious to air on at least one surface of the tubes.

6. An induction metal melting furnace comprising a body of electrically non-conducting refractory material formed with a pair of horizontally spaced chambers, tubes formed of electrically non-conducting refractory material which is normally pervious to air enclosed in the body of refractory material and connecting the chambers below the normal level of molten metal therein, an electric induction unit threading the tubes with its magnetic center intermediate the ends of the tubes to induce heating current in the metal in the tubes, and a vitrified covering which is impervious to air on the outer surface of the tubes.

7. An induction metal melting furnace comprising a body of electrically non-conducting refractory material formed in its upper part with an open topped chamber, a looped tube enclosed in the body with its ends communicating with the lower part of the chamber, the tube being formed of electrically non-conducting refractory material which is normally pervious to air, an electric induction unit threading the looped tube, and a covering of material which is impervious to air on at least one surface of the looped tube.

8. An induction metal melting furnace comprising a body of electrically non-conducting refractory material formed in its upper part with an open topped chamber, a looped tube enclosed in the body with its ends communicating with the lower part of the chamber, the tube being formed of electrically non-conducting refractory material which is normally pervious to air, an electric induction unit threading the looped tube, and a vitrified covering which is impervious to air on the outer surface of the looped tube.

9. In an induction metal melting furnace, an elongated tube of non-metallic, non-conducting material, and an electric induction unit around the tube with its magnetic center intermediate the ends of the tube, the tubing having at least one surface which is fused to make the tube wall impervious to air.

10. In an induction metal melting furnace, an elongated tube of non-metallic, non-conducting material, the walls of the tube being impervious to the passage of gas, and an electric induction unit around the tube with its magnetic center intermediate the ends of the tube.

11. An induction metal melting furnace comprising a body of refractory material formed with a chamber to hold molten metal, an elongated tube formed of non-metallic, non-conducting material communicating with the chamber and enclosed in the body of refractory material, the walls of the tube being impervious to the passage of air, and an electric induction unit around the tube with its magnetic center intermediate the ends of the tube.

References Cited in the file of this patent

UNITED STATES PATENTS

| Number | Name | Date |
|---|---|---|
| 756,891 | Potter | Apr. 12, 1904 |
| 1,152,586 | Wright | Sept. 7, 1915 |
| 1,803,282 | Morgan | Apr. 28, 1931 |
| 1,851,575 | Greene | Mar. 29, 1932 |
| 1,917,849 | Northrup | July 11, 1933 |
| 2,156,608 | Schon et al. | May 2, 1939 |
| 2,402,582 | Scaff | June 25, 1946 |
| 2,540,744 | Lillienberg | Oct. 1, 1948 |
| 2,585,791 | Klein | Feb. 12, 1952 |